N. SCARPONI.

SOFTENING DEVICE FOR SHOES.

APPLICATION FILED OCT. 26, 1917.

Reissued Mar. 2, 1920.

14,812.

INVENTOR-
Nazzareno Scarponi
By his Attorney
Nelson W. Howard

UNITED STATES PATENT OFFICE

NAZZARENO SCARPONI, OF DOVER, NEW HAMPSHIRE, ASSIGNOR, BY MESNE ASSIGNMENTS, TO UNITED SHOE MACHINERY CORPORATION, OF PATERSON, NEW JERSEY, A CORPORATION OF NEW JERSEY.

SOFTENING DEVICE FOR SHOES.

14,812. Specification of Reissued Letters Patent. Reissued Mar. 2, 1920.

Original No. 1,209,889, dated December 26, 1916, Serial No. 114,742 filed August 14, 1916. Application for reissue filed October 26, 1917. Serial No. 198,860.

*To all whom it may concern:*

Be it known that I, NAZZARENO SCARPONI, a citizen of the United States, residing at Dover, in the county of Strafford and State of New Hampshire, have invented new and useful Improvements in Softening Devices for Shoes, of which the following is a specification.

The present invention relates to a softening device for treating shoes during the process of their manufacture and more especially to a device for softening the toe portion of the materials in the upper portion of the shoe, as by heating or moistening preparatory to the lasting of the shoe. The softening operation consists generally in inserting the toe portion of the upper and adjacent forepart of the inner sole of the shoe into the chamber of a steam box or other receptacle where the parts will be subjected to the influence of steam introduced into the box or other hot aqueous vapor or any other desired treating or softening agent therein.

The process is accompanied with many difficulties prominent among which is the danger of injuring the upper or the sole depending upon which is subjected to the most direct influence of the steam or other softening agent. Conditions which result in a satisfactory softening of the upper tend also to soften the sole, thus making the sole unworkable. For example, the softening of the innersole may cause it to recede or to be pushed back easily from the edge of the last, making a bad inseam, and injuring the shape of the shoe. When live steam is employed the escape of the steam around the opening through which the toe is inserted is also an objectionable feature, since the steam treats portions of the shoe with which it should not be brought in contact, and besides, the liability of excessive quantities of vapor escaping in the atmosphere of the factory is objectionable.

It is accordingly among the objects of my invention to overcome in a very simple way and even when live steam is employed, all of the difficulties above referred to. In other words, by my present device I am enabled to eliminate all danger of injuring the upper or the sole. I am enabled, also, to soften only the upper without affecting the sole and am also enabled to prevent the escape of the steam or other treating agent.

The invention will be understood from the following description of a preferred embodiment thereof selected for purposes of illustration, and shown in the drawings in which, Figure 1 is a front elevation;

Figure 1:
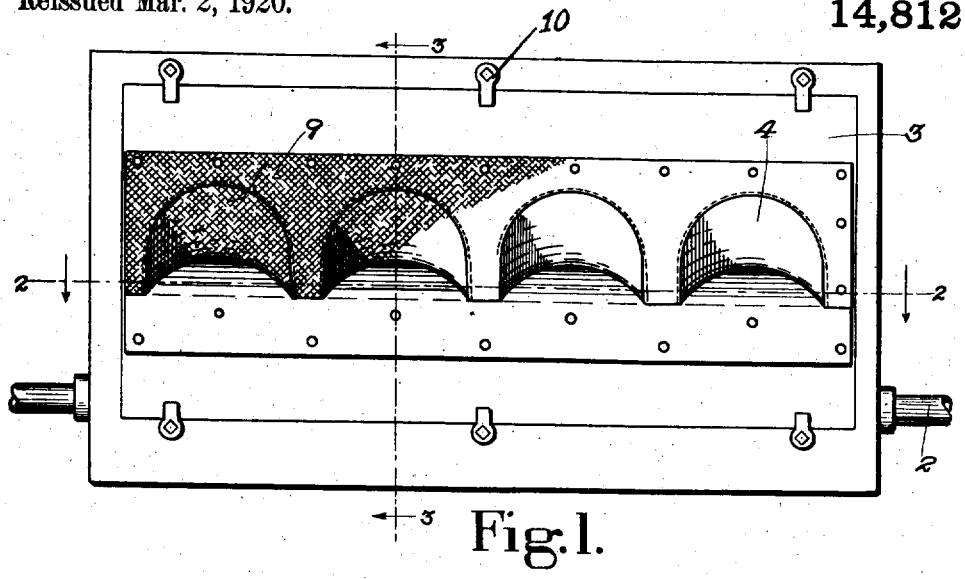
Figure 2:
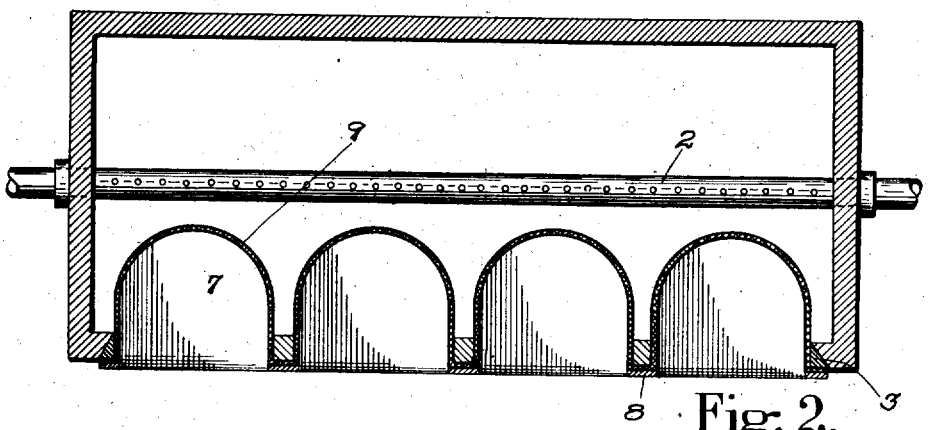
Fig. 2 is a section on the line 2—2 of Fig. 1.
Figure 3:
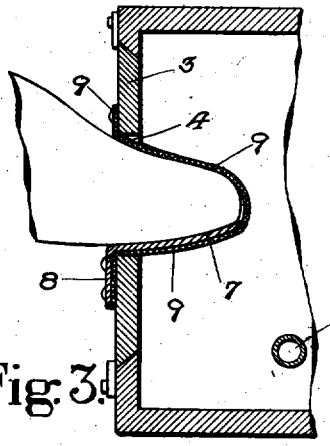
Figs. 3 and 4 are sections on the line 3—3 of Fig. 1 showing respectively a last and a last with a pulled over shoe in position in the apparatus.
Figure 4:
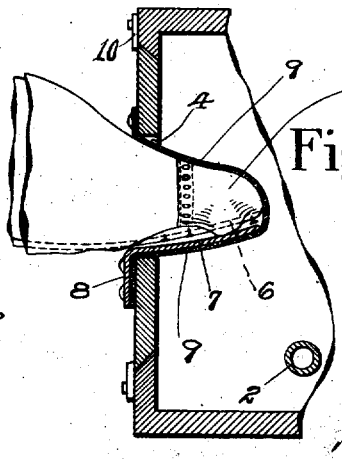

Referring to the drawings, 1 represents a receptacle for containing the softening agent. Inasmuch as steam is the agent I prefer to employ in most cases, the receptacle may be described as forming a steam-chamber, steam being discharged in said chamber by a pipe 2 that extends through walls of the receptacle. As shown by Fig. 2, the section of pipe that is inclosed in the receptacle is provided with holes 11 for discharging the steam. The receptacle includes a wall section 3, in which openings 4 are formed. Each of these openings has a shape conforming approximately to the cross-sectional shape of the forepart of a shoe, such shape being shown by Fig. 1. It it desirable that the wall section 3 be detachable from the remainder of the receptacle for the reason that it may be desirable to replace it, from time to time, with a wall section having openings 4 of another size to conform to the shoes being treated. Another reason for having the section 3 detachable is that it supports elements hereinafter described that form pockets for enveloping the toe portions of the shoes, and it is desirable to attach these elements and to make repairs, when necessary, while the section to which they are secured is detached from the remainder of the receptacle. The section 3 is, therefore, shown as being detachable, and the main part of the receptacle is shown as being provided with a plurality of retaining devices 10 arranged to overlap the marginal portions of the section 3 when the latter is in operative position. The top and bottom edges of the section 3, and the contiguous edges of the main part of the receptacle are shown as being beveled to serve conjointly with the retaining devices 10 to hold the detachable section securely in the desired position.

For purposes of illustration I have shown a shoe with the toe inserted within the chamber of the box, 5 indicating the upper of the toe portion or that to be softened, and 6 the sole portion of the toe which, as later will be explained, is not acted upon by the softening agent.

7 is a guard provided with a flanged edge 8 by which it is secured to the side 3 of the box. The retention of the guard is such that the guard proper will extend from the lower edge of the opening through which the unlasted shoe is inserted and bear snugly against the bottom of the shoe, which would otherwise be subjected to the influence of the steam or other softening agent. The guard is made of some substance impervious to the passage of steam or other softening or heating agent through it and it is preferably made of metal. The guard is preferably made of some resilient metal in order that it may bear with considerable pressure against the inserted toe portion of the shoe and, by its pressure, hold the shoe in place within the opening, the guard then operating to press the shoe against the opposite wall of the opening. The shoe is also supported in practice outside the receptacle or box by a suitable support (not shown) on which the heel or instep of the shoe may rest. Any suitable device may be employed for this purpose.

A curtain 9 is secured to the wall 3 in position to form, conjointly with the metallic guard 7, an envelop to inclose the toe end of the shoe, although, for convenience, the curtain extends under the guard 7 so that its lower edge may be attached directly to the wall 3 by the fasteners that anchor the guard to the wall. This curtain is made of any suitable substance, preferably of a flexible fibrous nature, which will protect the upper of the inserted toe portion from the direct contact of the steam or heated softening agent, which might otherwise injure it, permitting, however, the passage through it of the heated aqueous vapor or other softening agent sufficiently to soften the upper without injuring it. In practice I have found a medium heavy canvas cloth to be well adapted for such purpose, the canvas being simply tacked to the side of the box around the opening in it. The curtain thus arranged not only acts to protect the upper from the direct contact of the steam, or other softening agent, but also prevents successive escape thereof from the chamber of the box through the opening as might otherwise be the case.

In the use of the device the pocket-forming curtain which envelops the toe acts as above described to protect the toe from the direct contact of the steam or other softening agent, but permits of the passage through it of the aqueous vapor or other agent modified in such manner that it will operate to soften the upper without any danger of injuring it. Were it not for the guard the steam or other heating agent would soften or otherwise injure the sole of the inserted portion of the shoe, which is very undesirable, but the guard prevents the heating or other softening agent contacting with the sole, the sole, in other words, being maintained in its original dry and comparatively cool state so that the shoe may be immediately worked upon during the ensuing lasting operation.

It should be understood that the scope of the appended claims is not limited by the form of apparatus shown, and that the fundamental principles of the invention would be involved by the use of other heating agents, as for instance hot air. The so-called Beckwith box-toe and Beckwith counter stiffener are instances of shoe elements that are rendered soft and pliable for lasting by dry heat. I believe that a shoe-receiving chamber with parts of its walls differing in their capability of trasmitting a softening or heating agent to a shoe in the chamber, whereby the treatment of different parts of the shoe in the chamber may not be uniform is my invention.

Having fully described my invention, I claim and desire to secure by Letters Patent of the United States:

1. An apparatus for treating shoes, comprising walls arranged to form a chamber, and means arranged in said chamber to supply a treating agent therein, a portion of one of said walls being formed to protrude inwardly to provide a pocket for the reception of a portion of a shoe, said pocket-forming portion differing in different areas with respect to perviousness.

2. An apparatus for treating shoes, comprising walls arranged to form a treating chamber and a supply chamber and including a partition wall separating said chambers from each other, and means for supplying a treating agent in the supply chamber, said partition wall differing in different areas with respect to perviousness.

3. An apparatus for treating shoes, comprising means forming a pocket for the reception of a portion of a shoe, said means differing in different areas in respect to perviousness, and means arranged externally of said pocket to supply a treating agent to said portion of the shoe through said pocket-forming means.

4. In a device of the character specified, the combination comprising a receptacle having in it an opening through which the toe portion of a shoe may be inserted to lie within the chamber of said receptacle, means whereby steam may be supplied to the chamber of said receptacle, a guard impervious to the passage of steam arranged to engage the bottom of said inserted toe portion of the shoe whereby the steam or hot aqueous vapor arising therefrom may not engage said sole and soften the same, and a curtain arranged to envelop the upper of said inserted sole portion of the shoe for protecting the same from the direct contact of the steam but permitting the passage through it of heated aqueous vapor sufficient to soften said upper without injuring it.

5. In a device of the character specified, the combination comprising a steam box having in it an opening through which the toe portion of a shoe may be inserted to lie within the chamber of said box, means whereby steam may be supplied to the chamber of said box, a metallic guard arranged to engage the bottom of said inserted toe portion of the shoe, and a cloth curtain arranged to envelop the upper of said inserted sole portion of the shoe.

6. In a device of the character specified, the combination comprising a receptacle having a chamber adapted to receive the toe portion of a shoe, and means arranged to discharge a treating agent against the exterior of said receptacle, the latter including a portion pervious with respect to the treating agent and formed to envelop the upper of the toe portion, and including a guard impervious to moisture and formed to cover the sole of the toe portion.

7. In a device of the character specified, the combination comprising a receptacle adapted to receive the toe portion of a shoe inside the chamber thereof, means for supplying steam to said receptacle, and a curtain forming a pocket arranged to envelop the upper of said inserted sole portion of the shoe for protecting it from the direct contact of the steam but permitting the passage of heated aqueous vapor therethrough sufficient to soften said upper without injuring it.

8. In a device of the character specified, the combination comprising a receptacle having an opening through which the toe portion of a shoe may be inserted, means arranged to discharge steam in the receptacle, and a pocket of sheet material formed to envelop the toe portion and secured to the receptacle in position to receive the toe portion when the latter is inserted through said opening, a portion of said pocket being pervious with respect to steam.

9. In a device of the character specified, the combination comprising a receptacle having an opening through which the toe portion of a shoe may be inserted, means arranged to discharge a softening agent in said receptacle, and a shoe-supporting member secured to the receptacle to bear against the bottom of the inserted portion of the shoe to protect the sole from the influence of the softening agent.

10. In a device of the character specified, the combination comprising means for discharging a treating agent adapted to soften a portion of a shoe, and shoe protecting means consisting of an envelop formed and arranged to inclose an end of the shoe, said envelop including an impervious area arranged to cover a portion of said end and being pervious elsewhere to afford limited access of the treating agent to another portion of said end.

11. In a device of the character specified, the combination of a casing having a steam-chamber and an opening through which the toe portion of a shoe may be inserted, means arranged to discharge steam in said chamber, and a closure of absorbent sheet material arranged to close said opening and having an area substantially greater than that of the opening to enable the toe portion to be inserted through said opening without touching the steam in the casing.

12. An apparatus of the character described comprising a casing having walls forming a closed steam chamber, and means arranged to discharge steam in said chamber, said walls including a section composed of limp flexible sheet material that is pervious with respect to aqueous vapor, and in the form of a pocket to receive an end portion of a shoe.

13. An apparatus for treating shoes, comprising, in combination, a casing having a detachable wall section and a chamber formed in part by said section, the latter having an opening through which the toe portion of a shoe may be inserted, means arranged to discharge a treating agent in said chamber, and means secured to said detachable section in position to envelop a toe portion inserted through said opening, a portion of said enveloping means being pervious with respect to the treating agent.

14. In a device of the character specified, means for discharging a treating agent, means forming a receptacle adapted to envelop and conform substantially to the toe portion of a shoe, the latter means including a member composed of limp sheet material to inclose the upper of the toe portion, and including a member composed of relatively stiff sheet material and having an outline substantially like that of the bottom of the toe portion, the latter said member being arranged to sustain the member of limp material in a shape approximating that of the toe portion, said members differing in respect to perviousness, and means arranged to support said receptacle in coöperative relation to said discharging means to subject the toe portion, in part, to the influence of the treating agent.

15. In a device of the character specified, a chamber arranged to contain a shoe treating agent and having an aperture for the reception of a portion of a shoe, and a curtain making closed contact with the receptacle around the edge of the opening and arranged to form a pocket for receiving within it the inserted portion of the shoe.

16. An apparatus of the character described, comprising a casing having a chamber for a shoe-treating agent and having an opening of a shape to conform approximately to the cross-section of the forepart of a shoe, a sheet metal plate shaped to conform approximately to the bottom outline of the toe portion of the shoe, said plate being joined to the casing in position to extend inwardly from the corresponding edge of said opening, and a curtain of limp pervious sheet material arranged to coöperate with said plate to form a pocket adapted to envelop the toe portion inserted through said opening and to close said opening.

17. A device for regulating the action of a treating agent on the toe portion of a shoe, comprising an envelop conforming generally to the toe portion and adapted to inclose the latter, said envelop differing in different areas with respect to perviousness.

18. An apparatus for treating shoes, comprising means for supplying a treating agent, and work-supporting means in coöperative relation thereto, said work-supporting means including means formed to envelop a portion of a shoe and differing in different areas with respect to perviousness.

19. An apparatus for treating shoes, comprising, in combination, a casing having a detachable wall section in the form of a pocket and adapted to envelop an end portion of a shoe, a portion of said section being pervious with respect to the treating agent, and means arranged to support said detachable section in coöperative relation to the remainder of the casing.

In testimony whereof I have signed my name to the specification.

NAZZARENO SCARPONI.